(12) United States Patent
Padmanabhan et al.

(10) Patent No.: US 7,792,982 B2
(45) Date of Patent: Sep. 7, 2010

(54) SYSTEM AND METHOD FOR DISTRIBUTING STREAMING CONTENT THROUGH COOPERATIVE NETWORKING

(75) Inventors: Venkata N. Padmanabhan, Bellevue, WA (US); Philip A. Chou, Bellevue, WA (US); Jiahe Wang, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 1331 days.

(21) Appl. No.: 10/337,473

(22) Filed: Jan. 7, 2003

(65) Prior Publication Data

US 2004/0143672 A1 Jul. 22, 2004

(51) Int. Cl.
*G06F 15/16* (2006.01)
(52) U.S. Cl. ............... 709/231; 709/219; 709/238; 709/235; 709/250
(58) Field of Classification Search ............... 709/219, 709/231, 238, 235, 250
See application file for complete search history.

(56) References Cited

U.S. PATENT DOCUMENTS

| | | | | |
|---|---|---|---|---|
| 5,253,248 | A * | 10/1993 | Dravida et al. | 370/228 |
| 5,928,331 | A * | 7/1999 | Bushmitch | 709/231 |
| 6,018,741 | A * | 1/2000 | Howland et al. | 707/102 |
| 6,047,331 | A * | 4/2000 | Medard et al. | 709/239 |
| 6,832,249 | B2 * | 12/2004 | Yeager et al. | 709/223 |
| 6,847,685 | B1 * | 1/2005 | Fujiwara et al. | 375/240.16 |
| 6,859,455 | B1 * | 2/2005 | Yazdani et al. | 370/392 |
| 6,977,934 | B1 * | 12/2005 | Dalby et al. | 370/394 |
| 7,113,741 | B2 * | 9/2006 | Chuberre et al. | 455/3.06 |
| 2001/0034793 | A1 * | 10/2001 | Madruga et al. | 709/238 |
| 2002/0090009 | A1 * | 7/2002 | Yehuda et al. | 370/517 |
| 2002/0114332 | A1 * | 8/2002 | Apostolopoulos et al. | 370/392 |
| 2003/0007461 | A1 * | 1/2003 | Chen et al. | 370/254 |
| 2003/0009474 | A1 * | 1/2003 | Hyland et al. | 707/102 |
| 2003/0037167 | A1 * | 2/2003 | Garcia-Luna-Aceves et al. | 709/238 |
| 2003/0051051 | A1 * | 3/2003 | O'Neal et al. | 709/242 |
| 2003/0081582 | A1 * | 5/2003 | Jain et al. | 370/338 |
| 2003/0115340 | A1 * | 6/2003 | Sagula et al. | 709/228 |
| 2003/0152058 | A1 * | 8/2003 | Cimini et al. | 370/338 |
| 2003/0172362 | A1 * | 9/2003 | Mack-Crane et al. | 716/12 |
| 2004/0042473 | A1 * | 3/2004 | Park et al. | 370/408 |

(Continued)

OTHER PUBLICATIONS

"Communication over an Unknown Channel via Common Broadcasting", Nadav Shulman, Jul. 2003.*

(Continued)

*Primary Examiner*—Thu Nguyen
*Assistant Examiner*—Lan-Dai T Truong
(74) *Attorney, Agent, or Firm*—Wolf, Greenfield & Sacks, P.C.

(57) ABSTRACT

A system and method for distributing streaming content data from a server to multiple clients enables the server to handle transient surges of requests by having the clients cooperate with the server and other clients to distribute content, thereby alleviating the load on the server. The server divides the streaming content into multiple sub-streams (e.g., by using multiple description coding), and constructs multiple distribution trees with itself at the root and each client as a node in each of the trees. Each sub-stream is transmitted down a corresponding one of the distribution trees. Clients that receive sub-streams from its parent nodes in the distribution trees in turn forward the sub-streams to their child nodes in the trees.

17 Claims, 7 Drawing Sheets

U.S. PATENT DOCUMENTS

| | | | |
|---|---|---|---|
| 2004/0143647 A1* | 7/2004 | Cherkasova | 709/219 |
| 2004/0174815 A1* | 9/2004 | Khisti et al. | 370/235 |
| 2004/0226045 A1* | 11/2004 | Nadarajah | 725/97 |
| 2005/0002337 A1* | 1/2005 | Wang et al. | 370/235 |
| 2005/0152456 A1* | 7/2005 | Orchard et al. | 375/240.24 |
| 2006/0109901 A1* | 5/2006 | Ye et al. | 375/240.08 |
| 2006/0150053 A1* | 7/2006 | van der Schaar et al. | 714/752 |

OTHER PUBLICATIONS

Barabasi et al., "Emergence of Scaling in Random Networks," *Science*, vol. 286, pp. 509-512 (1999).

Bu et al., "Network Tomography on General Topologies," *Proc. ACM SIGMETRICS*, Marina Del Rey, CA, Jun. 15-19, 2002.

Carnegie-Mellon University, "End System Multicast," http://esm.cs.cmu.edu, printed on May 6, 2004.

Castro et al., "SplitStream: High-bandwidth Content Distribution in Cooperative Environments," *Proceedings of the Nineteenth ACM Symposium on Operating Systems Principles*, Bolton Landing NY, USA, Oct. 19-22, 2003.

Chawathe et al., "Making Gnutella-like P2P Systems Scalable," *Proceedings of ACM SIGCOMM 2003*, Karlsruhe, Germany, Aug. 2003.

Chou et al., "Clustering Source/Channel Rate Allocations for Receiver-driven Multicast under a Limited Number of Streams," *2000 IEEE International Conference on Multimedia and Expo (ICME 2000)*, pp. 1221-1224 (Jul. 2000).

Chou et al., "Error Control for Receiver-Driven Layered Multicast of Audio and Video," *IEEE Transactions on Multimedia*, vol. 3, No. 1, pp. 108-122 (Mar. 2001).

Chou et al., "Layered Multiple Description Coding," *Proceedingss of the Packet Video Workshop*, Nantes, France, Apr. 2003.

Chu et al., "Enabling Conferencing Applications on the Internet Using an Overlay Multicast Architecture," *Proceedings of ACM SIGCOMM '01*, San Diego, CA, Aug. 2001.

Davis et al., "Joint Source and Channel Coding for Image Transmission Over Lossy Packet Networks," *SPIE*, vol. 2847, pp. 376-387 (Aug. 1996).

Liu et al., "A Hybrid Adaptation Protocol for TCP-Friendly Layered Multicast and Its Optimal Rate Allocation," *Proceedings of IEEE INFOCOM '02*, pp. 1520-1529 (Jun. 2002).

Majumdar et al., "Rate-Distortion Efficient Video Transmission from Multiple Servers," *International Conference on Multimedia and Expo (ICME)*, Lausanne, Switzerland (Aug. 2002).

McCanne et al., "Receiver-Driven Layered Multicast," *Proceedings of ACM SIGCOMM '96*, Stanford, CA, pp. 117-130 (Aug. 1996).

Medina et al., "BRITE: An Approach to Universal Topology Generation," *International Symposium in Modeling, Analysis and Simulation of Computer and Telecommunication Systems (MASCOTS '01)*, Aug. 15-18, 2001, Cincinnati, OH, Aug. 15-18, 2001.

Mohr et al., "Approximately Optimal Assignment for Unequal Loss Protection," *Proceedings of the IEEE International Conference on Image Processing (ICIP 2000)*, vol. 1, pp. 367-370 (Sep. 2000).

Mohr et al., "Unequal Loss Protection: Graceful Degradation of Image Quality over Packet Erasure Channels Through Forward Error Correction," *IEEE Journal on Selected Areas in Communications*, vol. 18, No. 6, pp. 819-829 (Jun. 2000).

Nguyen et al., "Distributed Video Streaming with Forward Error Correction," *Packet Video Workshop*, Pittsburgh, PA (2002).

Padmanabhan et al., "Distributing Streaming Media Content Using Cooperative Networking," *Proceedings of the 12th International Workshop on Network and Operating Systems Support for Digital Audio and Video (NOSSDAV 2002)*, pp. 177-186 (May 2002).

Padmanabhan et al., "Resilient Peer-to-Peer Streaming," *Proceedings of the 11th IEEE International Conference on Network Protocols (ICNP'03)*, Nov. 4-7, 2003, Atlanta, GA (2003).

Padmanabhan et al., "Supporting Heterogeneity and Congestion Control in Peer-to-Peer Multicast Streaming," *The 3rd International Workshop on Peer-to-Peer Systems (IPTPS 2004)*, San Diego, CA, Feb. 26-27, 2004 (2004).

Rawflow, Ltd., "Rawflow's Intelligent Content Distribution," http://www.rawflow.com/technology.html, retrieved from the internet on May 4, 2004.

Stanković et al., "Packet Loss Protection of Embedded Data with Fast Local Search," *ICIP: 2002 Proceedings of International Conference on Image Processing*, vol. II, pp. 165-168 (Sep. 2002).

Wu et al., "Thin Streams: An Architecture for Multicasting Layered Video," in *Proc. International Workshop on Network and Operating System Support for Digital Audio and Video (NOSSDAV)*, St. Louis, MO (May 1997).

Zimmermann, "OSI Reference Model—The ISO Model of Architecture for Open Systems Interconnection," *IEEE Transactions on Communications*, vol. COM-28, No. 4, pp. 425-432 (Apr. 1980).

Wicker, "Error Control Systems for Digital Communication and Storage," Prentice Hall, Copyright © 1995 512 pp.

Puri et al., "Multiple Description Source Coding using Forward Error Correction Codes," *The Thirty-Third Asilomar Conference on Signals, Systems, & Computers*, 1999, pp. 342-346.

Goyal, "Multiple Description Coding: Compression Meets the Network," *IEEE Signal Processing Magazine* Sep. 2001 pp. 74-93.

Albanese et al., "Priority Encoding Transmission," *International Computer Science Institute*, 1994, 34 pages.

\* cited by examiner

SYSTEM AND METHOD FOR DISTRIBUTING STREAMING CONTENT THROUGH COOPERATIVE NETWORKING

TECHNICAL FIELD

This invention relates generally to the transmission of data over a computer network, and more particularly to a way to enable a server to distribute streaming content to a large number of clients, especially during a surge of requests.

BACKGROUND OF THE INVENTION

The Internet has become a major source of information. At any given time, hundreds of thousands of clients are downloading information from various servers on the Internet. For any given server, an important technical issue is the number of clients it is able to serve at a given time. Unacceptable delay may be experienced if the number of client requests significantly exceeds the capacity of the server.

This issue of server capacity is critical in the case of streaming media content. Recently, there has been an explosive growth of streaming media applications on the Internet. With a typical streaming media application, video and/or audio data are streamed from a server to a requesting client for playback by the client. Since the video and audio data are continuously transmitted at a relatively high rate, streaming media content places a significant demand on the server's bandwidth. An especially difficult technical challenge is the server's ability to handle transient surges in the number of clients requesting the streaming media data. A sudden surge of the number of requesting clients, also called a "flash crowd," is often experienced after the occurrence of a significant event of widespread interest, such as a major earthquake or terrorist attack. Due to the high bandwidth demand of streaming media content, the large number of requests in a flash crowd situation can easily overwhelm a server.

There has been much work in recent years on the topic of efficient content distribution. That work has largely fallen into two categories: infrastructure-based content distribution and peer-to-peer content distribution. An infrastructure-based content distribution network (CDN) (e.g., the Akamai network) complements a server in a traditional client-server framework by employing a dedicated set of machines to store and distribute content to clients on behalf of the server. Even though a large well-engineered CDN could handle a large flash crowd effectively, such a solution is unlikely to be affordable for a large class of sites that only rarely experience a significant volume of load. A peer-to-peer content network (e.g., Napster and Gnutella), in contrast, relies on clients to host the content and distribute it to other clients and typically has no central server that holds the content. Thus, it does not address the issue of how to enable a server to distribute streaming media content to a large number of clients during a transient surge of requests.

SUMMARY OF THE INVENTION

In view of the foregoing, the present invention provides a system and method for distributing streaming media content from a server to multiple clients that is scalable and can effectively handle a "flash crowd," i.e., a sudden surge of requests from clients for the streaming media content. In accordance with the invention, the server providing the streaming content and the clients that want to receive the content collaborate in a form of "cooperative networking" in which the clients forward the content they have received to other clients, thereby alleviating the load on the server.

Specifically, the server constructs and maintains a plurality of distribution trees. The server is at the root of each of the distribution trees, and each client that wants to receive the content from the server is placed as a node in each of the multiple distribution trees in such a way that the resulting trees are distinct. The streaming content to be distributed to the clients is divided and encoded into multiple sub-streams (e.g., by using multiple description coding (MDC) or forward error correction (FEC) coding), and each sub-stream is delivered over a corresponding distribution tree. The MDC may be optimized to match the failure probabilities of the resulting trees. When a client receives a sub-stream from its parent node (which may be the server or a peer client) in the corresponding distribution tree, it forwards the sub-stream to those clients that are its children nodes in the distribution tree.

The multiple distribution trees provide diversity in the distribution paths, thereby improving the robustness of the distribution. If a client node in the trees departs or fails, the clients that are downstream of that client in one distribution tree are generally not the same clients downstream from that client in another distribution tree. Hence, it is rare for a client to lose all sub-streams sent out by the server. Even though each client may not always receive all the sub-streams, it can reconstruct the streaming content from those sub-streams it receives, and the quality of reconstruction depends on the number of sub-streams received. In contrast, if there is only a single distribution tree, then all clients that are downstream from a departed or failed client will also fail to receive further streaming content.

Because the clients are not permanently connected to the server and their peer clients but rather may arrive and depart frequently, the distribution trees have to be maintained and modified accordingly. When a new client requests to receive the streaming content, the server goes down each distribution tree to find a node that can take the new client as its child node. When a client departs or somehow goes out of service, the server repairs the trees by reconnecting the children nodes of that client to live nodes in the trees so that they can continue to receive the sub-streams. The tree construction may be optimized by selecting parent nodes that have short network distances from a new node.

DETAILED DESCRIPTION OF THE INVENTION

Figure 1:
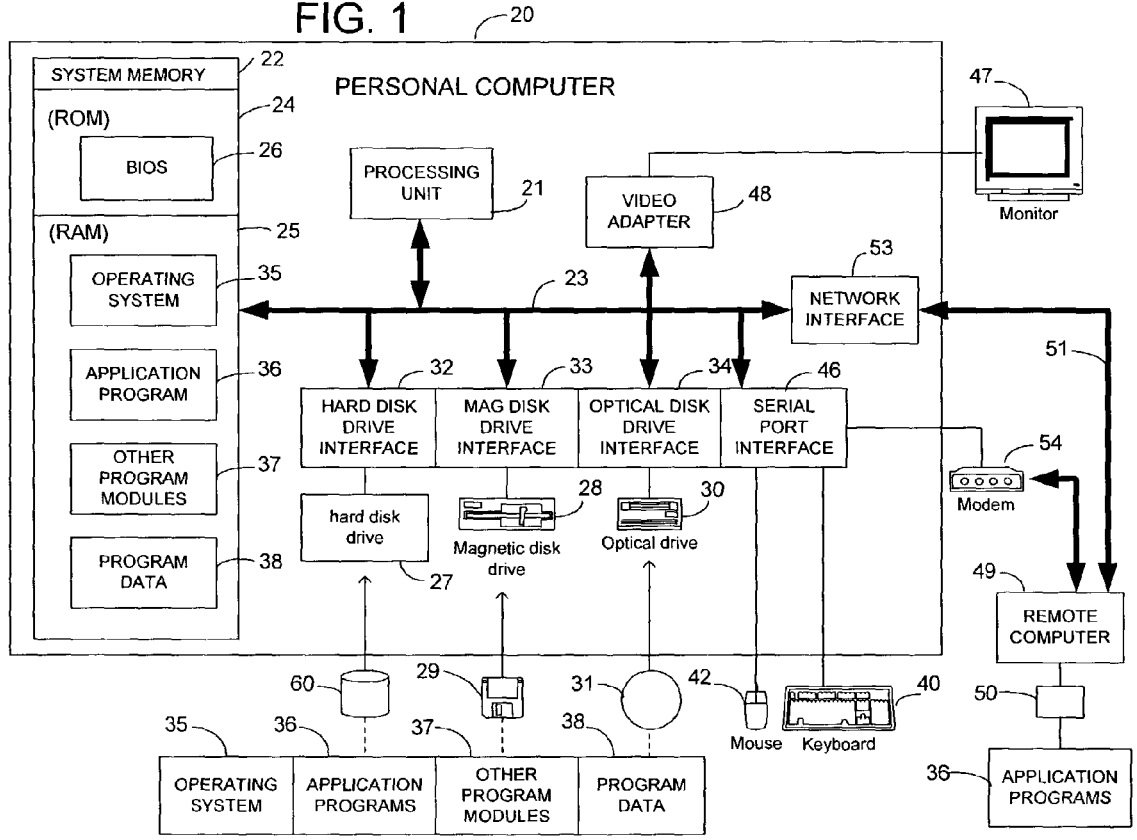
FIG. 1 is a block diagram generally illustrating an exemplary computer system on which a network server or client participating in the cooperative networking in accordance with the present invention may be implemented.

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCs, minicomputers, mainframe computers, and the like. The invention may be practiced in distributed computing environments where tasks are performed by remote processing devices that are linked through a communications network. In a distributed computing environment, program modules may be located in both local and remote memory storage devices.

The following description begins with a description of a general-purpose computing device that may be used for implementing components of an exemplary system of the invention, and the invention will be described in greater detail with reference to FIGS. 2-7. Turning now to FIG. 1, a general purpose computing device is shown in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help to transfer information between elements within the personal computer 20, such as during start-up, is stored in ROM 24. The personal computer 20 further includes a hard disk drive 27 for reading from and writing to a hard disk 60, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer readable instructions, data structures, program modules and other data for the personal computer 20. Although the exemplary environment described herein employs a hard disk 60, a removable magnetic disk 29, and a removable optical disk 31, it will be appreciated by those skilled in the art that other types of computer readable media which can store data that is accessible by a computer, such as magnetic cassettes, flash memory cards, digital video disks, Bernoulli cartridges, random access memories, read only memories, storage area networks, and the like may also be used in the exemplary operating environment.

A number of program modules may be stored on the hard disk 60, magnetic disk 29, optical disk 31, ROM 24 or RAM 25, including an operating system 35, one or more applications programs 36, other program modules 37, and program data 38. A user may enter commands and information into the personal computer 20 through input devices such as a keyboard 40 and a pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB) or a network interface card. A monitor 47 or other type of display device is also connected to the system bus 23 via an interface, such as a video adapter 48. In addition to the monitor, personal computers typically include other peripheral output devices, not shown, such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the WAN 52. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

In the description that follows, the invention will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operations described hereinafter may also be implemented in hardware.

Figure 2:
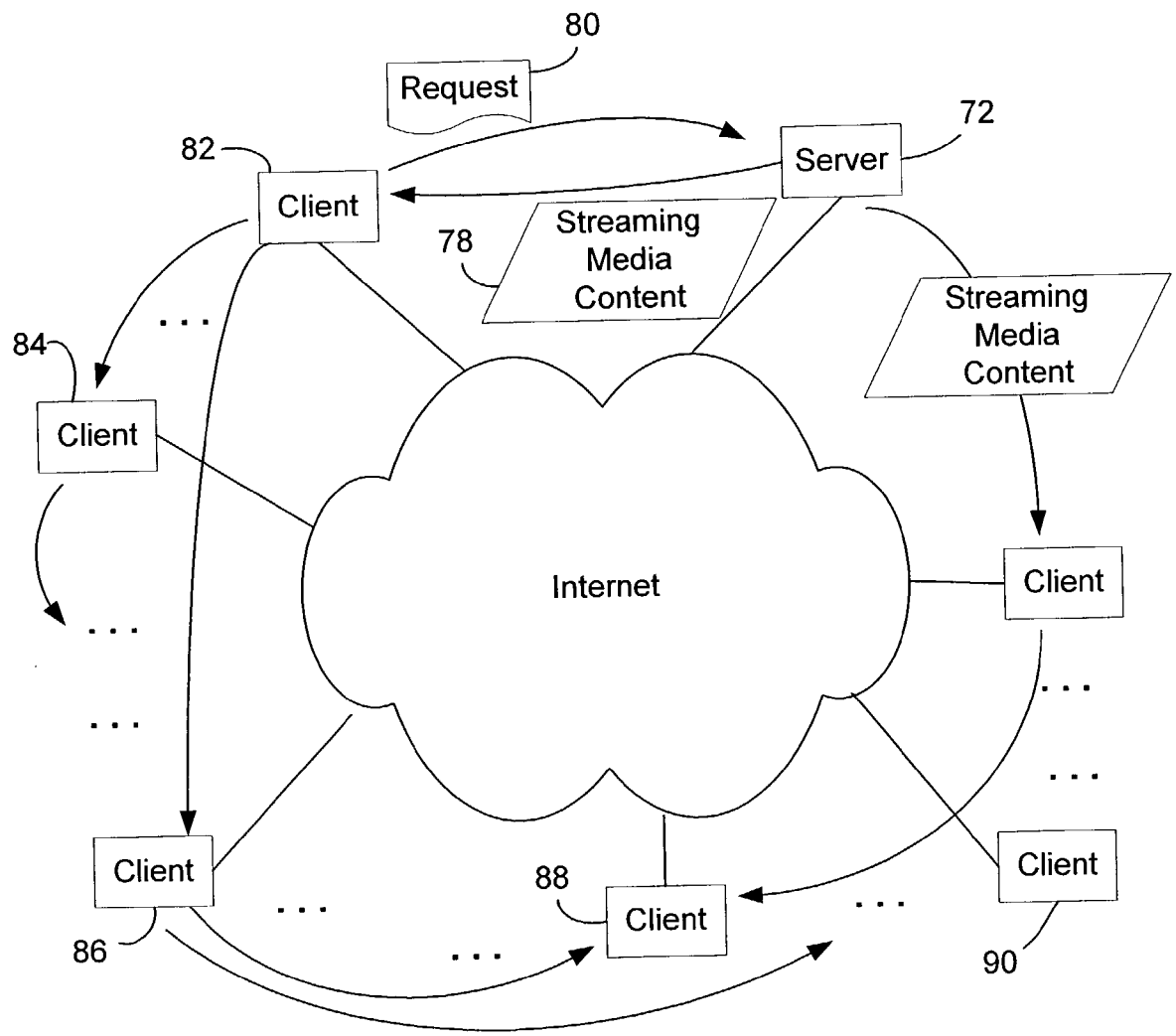
FIG. 2 is a schematic diagram showing a computer network over which a server distributes streaming media content to a plurality of clients.

Referring now to FIG. 2, the present invention is directed to a networking approach that enables a server 72 on a network 76, such as the Internet, to distribute streaming data to a large number of clients in situations of transient surges in which the number of requests may significantly exceed, sometimes by orders of magnitude, the number of clients the server can handle directly. The approach of the invention is especially effective for distributing live streaming media content to a large number of clients, and a preferred embodiment is described below in connection with the distribution of such data. The term "live streaming" as used herein refers to the synchronized distribution of streaming media content to one or more clients, and the content may either be truly live or pre-recorded. For example, the content may be the video and audio data of a major sport event, or the recorded footage of an earthquake. It will be appreciated, however, the same networking approach can also be advantageously used for distributing other types of data and is not limited to distributing live streaming data.

As shown in FIG. 2, the server 72 and the clients are connected to the network 76. To receive a live stream of media content, each client (e.g., the client 82) transmits a request 80 to the server 72 for the desired content. Typically, upon receiving a request, the server 72 may transmit the required content directly to the requesting client. Since each streaming transmission requires a finite amount of network bandwidth of the server, the number of clients the server is able to handle directly is limited by the total bandwidth of the server. Even though a server is typically provided with a significant amount of bandwidth to enable it to server many clients at the same time, from time to time it may experience sudden surges in the number of clients trying simultaneously to obtain the media content from the server. Such a sudden surge, often called a "flash crowd," is typically caused by an event of widespread interest, such as a sport event or an earthquake. For simplicity of illustration, only a small number of clients 82-90 are shown in FIG. 2, although in a real-world flash crowd situation there may be thousands or more clients trying to receive the streaming content from the server at the same time. If the server 72 attempts to send the streaming media content directly to each of the requesting clients, it will be quickly overwhelmed by the large number of demands. Server overload can cause significant degradation in the quality of the streaming media content received by the clients. It will be appreciated, however, that a flash crowd situation is not the only time the technology of the invention can be used. The same "cooperative networking" approach can be advantageously used for live streaming whenever the number of clients is larger than what is possible or desirable for the server to serve directly (i.e., with direct transmission from the server), even in the absence of a flash crowd.

The present invention provides a solution to the server overload problem by taking a "cooperative networking" approach that has the clients cooperate with the server and their peer clients to form a distribution network, in which a client forwards the content data it receives to other clients. By asking the clients to participate in the content distribution, the load on the server is alleviated. Thus, instead of receiving the streaming content data directly from the server, a client may receive portions or all of the data from its peer clients. By way of example, the client 82 in FIG. 2 receives a portion of the streaming media content data 78 from the server 72 and then forwards the streaming data to the clients 84 and 86. The client 86 in turn forwards the data it receives from the client 82 to other clients, such as the client 88. As the number of clients involved in the distribution increases, so does the aggregate outgoing bandwidth of the set of clients. As a result, the cooperative networking approach is scalable and can easily accommodate flash crowds of different sizes.

Figure 3:
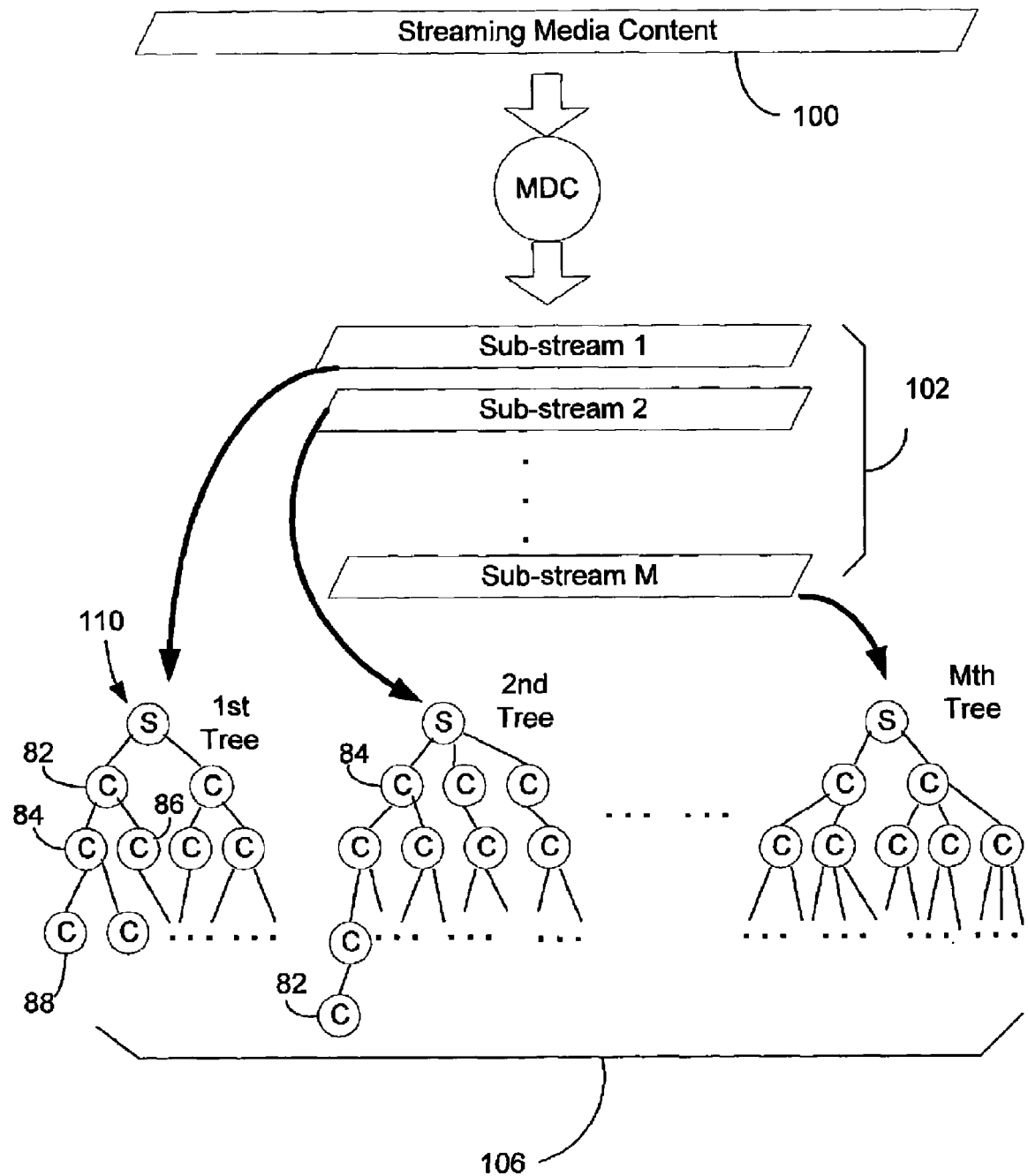
FIG. 3 is a schematic diagram showing a cooperative networking scheme for distributing streaming content according to the invention that divides the streaming content data into multiple sub-streams and delivers the sub-streams along respective distribution trees that have the server at their roots and clients as their nodes.

Referring now to FIG. 3, in accordance with a feature of the invention, to ensure the average quality of the streaming media content data received by the clients, the streaming content data 100 sent out by the server 72 are divided into multiple sub-streams 102, which may be formed by, for example, using multiple description coding (MDC). In conjunction with the division of the content into multiple sub-streams, the server sets up a plurality of distinct and diverse distribution trees 106 each for distributing one of the sub-streams. Each distribution tree has the server at its root and clients forming the other nodes of the tree. Each client that has requested to receive the streaming data becomes a node in each of the distribution trees. For example, in the first distribution tree 110 in FIG. 3, the client 82 has the server as its parent node and the clients 84 and 86 as its child nodes. When a client receives a sub-stream from its parent node in the corresponding distribution tree, it forwards the sub-stream to its child nodes, which in turn forwards the sub-stream to their child nodes.

As will be described in greater detail below, the distribution trees are formed in such way to be distinct and diverse. For example, the client 82 in the first tree may exist as a leaf node in the second tree, while the client 84, which is a child nod of the client 82 in the first tree, may exist as a child node of the root node (i.e., the server) in the second tree. Thus, if the client 82 fails, the client 84 will lose the first sub-stream, but not the second sub-stream. In general, if the trees are randomly constructed (e.g., if all the trees have the same structure but the clients are randomly permuted among the tree nodes), then each client will be assigned a random position in the tree, and have a random set of ancestors in each tree. In this case, the probability that a client loses the mth sub-stream is the probability that one or more of its ancestors in the mth tree should fail. Because the trees are distinct and independent, the probability that a client loses all of the sub-streams decreases exponentially with the number of sub-streams, and in general the number of sub-streams received by a randomly chosen client is binomially distributed according to a probability distribution p(m) determined by the structure of the trees. In practice, the trees may not be formed completely at random, but a diverse set of trees will have similar properties.

In a preferred embodiment, the generation of multiple sub-streams (or "descriptions") for distribution over the distinct distribution trees is by means of multiple description coding (MDC). Multiple description coding is a method of encoding video and/or audio signal into a number M>1 separate sub-streams or "descriptions" such that any subset of these descriptions can be received and decoded into a signal with a level of distortion (with respect to the original signal) commensurate with the number of descriptions received. The more descriptions a client receives, the lower the distortion becomes and the higher the quality of the reconstructed signal is. To this end, in MDC every subset of descriptions has to be decodable.

The combination of dividing the content into multiple sub-streams using multiple distribution coding and transmitting the sub-streams through multiple distribution trees allows the clients to effectively participate in the distribution of streaming content. This approach addresses an important difference between clients and dedicated servers such as those used in an infrastructure-based distribution network. Unlike dedicated servers, clients may come and leave at a high frequency in a real-world application, and the ability and willingness of the clients to participate in the content distribution tend to fluctuate with time. For instance, a client's participation may terminate when the user of the client tunes out of the live stream. Even when the user is tuned in to the live stream, the bandwidth and resources of the client for redistributing the streaming data to other clients may be scaled down or stopped immediately when the user initiates other unrelated network communications. Machines may also crash or become disconnected from the network. If a single distribution tree is used to distribute the (undivided) streaming content, the departure or reduced availability of a node has a severe impact on its descendents on the tree, as they will receive no streaming data at all until the tree is repaired. This can be especially problematic in flash crowd situations because the arrivals and departures of the clients forming the nodes of the tree can be quite frequent. Having multiple distribution trees spanning a given set of nodes and transmitting a different sub-stream (MDC description) down each tree diminishes the chances of a node losing the entire stream (even temporarily) because of the departure of another node.

There are many MDC schemes that may be used. For instance, a simple MDC system for video demultiplexes an original video picture sequence into M subsequences by putting every Mth picture, m+iM, where i=0, 1, 2, . . . , into the mth subsequence, m=1, . . . , M. The sub-sequences are independently encoded to form the M descriptions to be transmitted down the M distribution trees, respectively. Any subset of the M descriptions received by a client can be decoded and the pictures can be re-multiplexed to reconstruct a video sequence whose frame rate is essentially proportional to the number of descriptions received.

More sophisticated schemes of multiple description coding have been investigated over the years. In a preferred embodiment of the invention, a particularly efficient and practical MDC operation is used that is based on layered audio or video coding, Reed-Solomon coding (or other minimum distance separable coding techniques), priority encoding transmission, and optimized bit allocation. Reed-Solomon coding is well known. For instance, it is described in S. B. Wicker, *Error Control Systems for Digital Communication and Storage*, Prentice Hall, 1995, which is hereby incorporated by reference. Priority encoding transmission is also well known. For instance, it is described in A. Albanese, J. Blömer, J. Edmonds, M. Luby, and M. Sudan, *Priority Encoding Transmission*, IEEE Trans. Information Theory, 42:1737-1744, November 1996, which is also hereby incorporated by reference.

Figure 4:
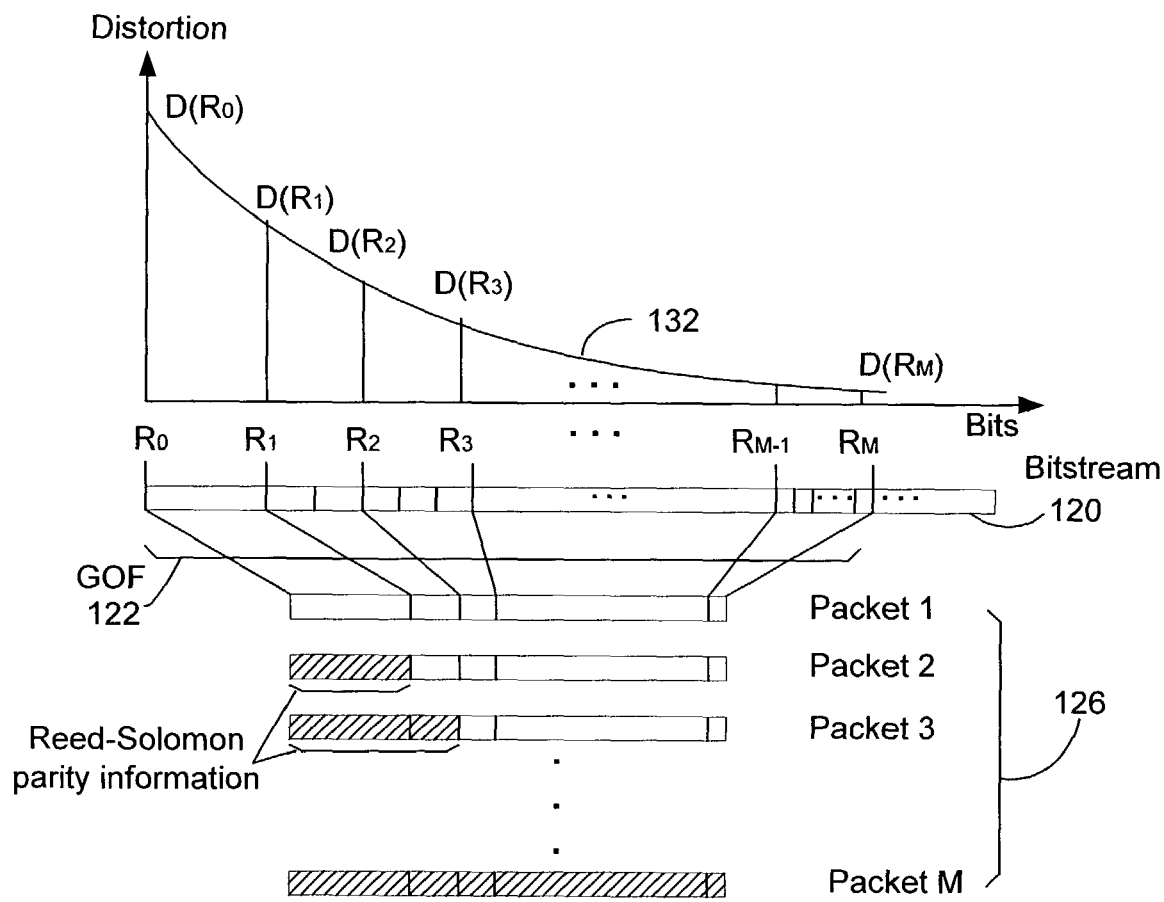
FIG. 4 is a schematic diagram illustrating a way of multiple description coding (MDC) used in a preferred embodiment that divides a group of frames (GOF) in the streaming content into multiple packets.

Referring to FIG. 4, in this MDC operation, the audio and/or video signal 120 is partitioned into groups of frames (GOFs), each group having a duration T that is about one second or so. Each GOF 122 is then independently encoded, error protected, and packetized into M packets 126. If any $m \leq M$ packets are received by a client, then the initial $R_m$ bits of the bit stream from the GOF can be recovered, resulting in a distortion $D(R_m)$, where $0=R_0 \leq R_1 \leq \ldots \leq R_M$, and consequently $D(R_0) \geq D(R_1) \geq \ldots \geq D(R_M)$. This dependence of $D(R_m)$ on the bits $R_m$ is also illustrated schematically by the distribution curve 132 in FIG. 4. Thus, all M packets are equally important; only the numbers of received packets determines the reconstruction quality of the GOF. Further, the expected distortion is $\Sigma^M_{m=0} p(m)D(R_m)$, where p(m) is the probability that m out of M packets are received. Given p(m) and the operational distortion-rate function D(R), this expected distortion can be minimized using a simple procedure that adjusts the rate points $R_1, \ldots, R_M$, subject to a constraint on the packet length. This procedure is described, for example, in R. Puri and K. Ramchandran, *Multiple Description Source Coding through Forward Error Correction Codes*, Proc. Asilomar Conference on Signals, Systems, and Computers, Asilomar, Calif., October 1999, IEEE; and V. K. Goyal, *Multiple Description Coding: Compression Meets the Network*, IEEE Signal Processing Magazine, pp. 74-93, September 2001. These documents are hereby incorporated by reference. This optimization can be performed periodically as either the probability p(m) changes (e.g., as the result of adding or deleting nodes in the trees) or as the distortion rate function D(R) changes (e.g., as a result of the signal varying).

Figure 5:
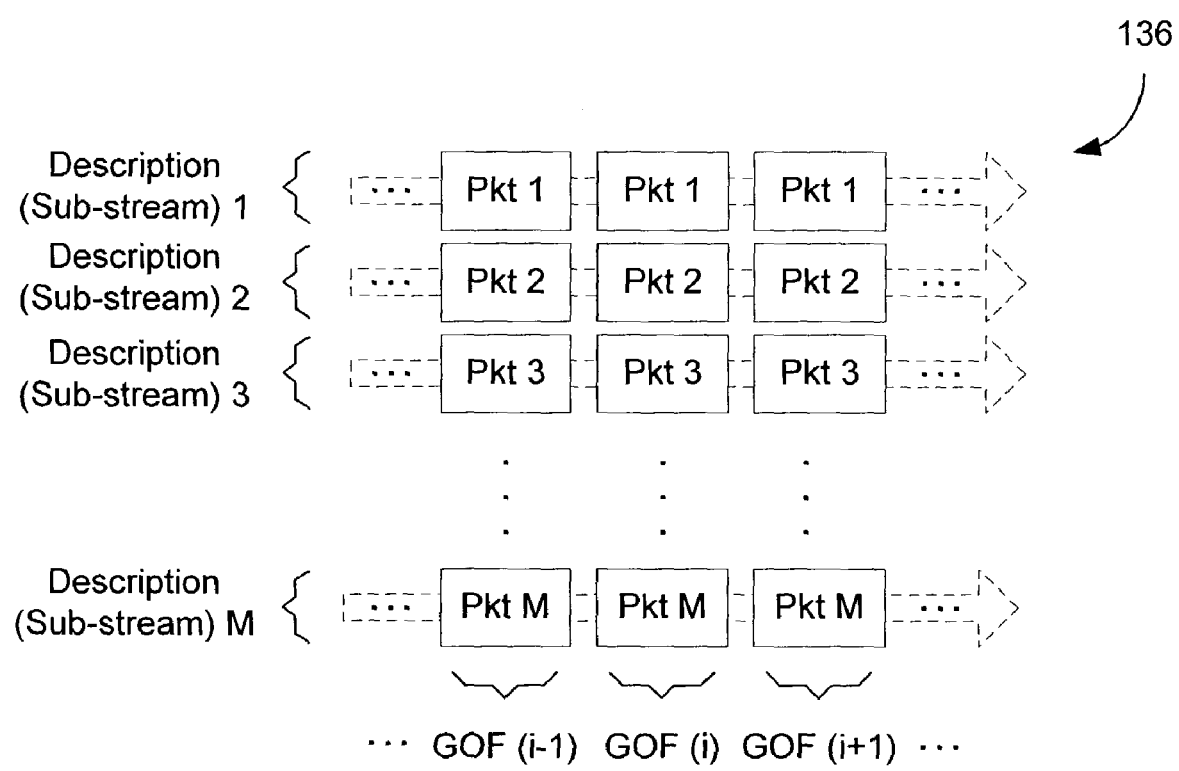
FIG. 5 is a schematic diagram illustrating the formation of multiple sub-streams (or descriptions) from the MDC packets in FIG. 4.

Turning now to FIG. 5, by sending the mth packet in each GOF to the mth description (i.e., sub-stream), the entire audio and/or video signal is represented by M descriptions 136, where each description is a sequence of packets transmitted at the rate of one packet per GOF. It is very easy to generate these optimized M descriptions on the fly, assuming that the signal is already coded with a layered codec.

It will be appreciated that there are other ways besides MDC for generating multiple sub-streams from the streaming media content. For instance, forward error correction (FEC) can be regarded as a similar method of partitioning video and/or audio signals into a number K sub-streams, and encoding these into M>K sub-streams such that receiving any K of these M sub-streams is sufficient for recovering the original K sub-streams. The FEC encoding can be used in place of MDC when distributing the data across the multiple description trees, although FEC will generally not have the graceful degradation properties of MDC.

The robustness of the cooperative networking for distributing streaming content depends on how well the server constructs and maintains the distribution trees in the face of the frequent arrivals and departures of the nodes. There are several goals for the tree management algorithm. First, it is desirable to keep the tree short so as to minimize the latency of the path from the root (i.e., the server) to the deepest leaf node and also to minimize the probability of disruption due to the departure of a node closer to the root. For the tree to be short, the tree should be balanced and as wide as possible by making the out-degree (i.e., the number of child nodes) of each node as much as its the bandwidth allows. Making the out-degree large, however, may leave little bandwidth for other traffic emanating from the node, and interference with such traffic could cause a high packet loss rate for the streaming content data. Second, the distribution trees should be efficient in that their structure should closely reflect the underlying network topology. However, striving for efficiency may interfere with the also important goal of having diverse distribution trees, as the effectiveness of the MDC-based distribution scheme depends strongly on the diversity of the distribution trees. Third, the processing of node joins and leaves should be quick. This would ensure that the interested nodes would receive the streaming content as quickly as possible in the case of a join and with minimal disruption in the case of a leave of an upstream node. The quick processing of joins and leaves, however, should be done in a way that does not interfere with the goals of having efficient and balanced trees as described above. Fourth, the tree management should scale to a large number of nodes, with a correspondingly high rate of node arrivals and departures.

Figure 6:
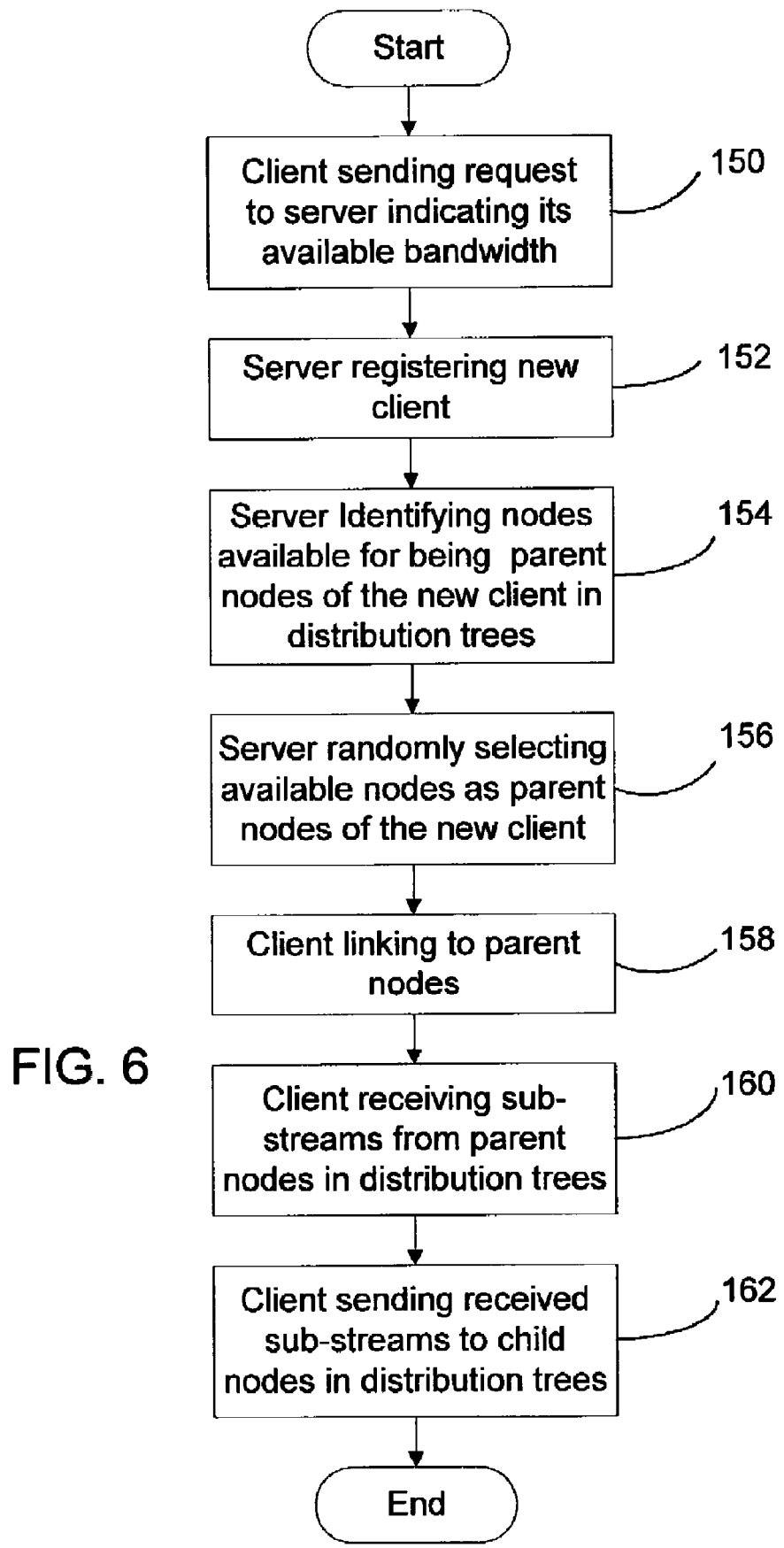
FIG. 6 is a flowchart showing a process of a preferred embodiment for joining a new client into each of the multiple distribution trees for distributing streaming content.

In accordance with a feature of a preferred embodiment, the tree construction and management functions are performed by the server in a centralized manner. The server has full knowledge of the topology of all of the distribution trees so that it can add and remove nodes on the fly. Referring now to FIG. 6, when a new node wants to join the streaming distribution system, it first contacts the server by sending a request (step 150). Besides expressing its desire for the streaming media content, the new node also informs the server of its available network bandwidth to serve potential down-stream nodes. The server registers the new client's attributes in a database (step 152), and responds with a list of designated parent nodes, one for each of the distribution trees.

In a preferred embodiment, the designated parent node in each distribution tree for a requesting client is chosen as follows. Starting at the root of the tree, the server goes down the tree until it gets to a level where it finds one or more nodes that have the necessary spare capacity (primarily network bandwidth) to serve as the parent of the new node (step 154). The server itself could be the new parent if it has sufficient spare capacity, which may be the case during the early stages of tree construction. If there are multiple available nodes, the server picks one randomly to be the designated parent of the new node (step 156). In this way, the server assigns one parent node for each of the distribution trees used to distribute the multiple MDC descriptions. The top-down approach in choosing the parent nodes ensures a short and largely balanced tree. The randomization helps make the trees diverse.

Upon receiving the server's message containing information about the designated parent nodes in each tree, the new client sends concurrent messages to the designated parent nodes to link to them as a child node in each distribution tree (step 158). After linking to the parent nodes in the separate distribution trees, the node receives sub-streams from the respective parent nodes (step 160). If subsequently the node itself becomes a parent node (by the server's assigning child nodes to it), it forwards the sub-stream it has received to its child nodes (step 162).

When a client leaves, it can no longer participate in the cooperative networking, and all the nodes representing it in the distribution trees have to be removed. If the departing client serves as a parent node in a distribution tree, then all its child nodes (and all the nodes descending from the child nodes) have to be reassigned to other available parent nodes. Node departures can be generally divided into two kinds: graceful departures and node failures. In the case of a graceful departure, the departing client informs the server of its intention to leave. Since each client may serve as a parent node in a plurality of the distribution trees, more than one tree may have to be repaired. For each distribution tree, the server identifies the children nodes of the departing client. It then executes a join operation for each child node (and implicitly the sub-tree connected to the child node) using the same top-down process described above to find a new parent node in the tree for the child node. To reduce the messaging load of the server, the server could make the selection of the new parent in each tree for each child, and then leave it to another node, such as the departing node if it is still available, to convey the information about the new parent to each of the children nodes.

Figure 7:
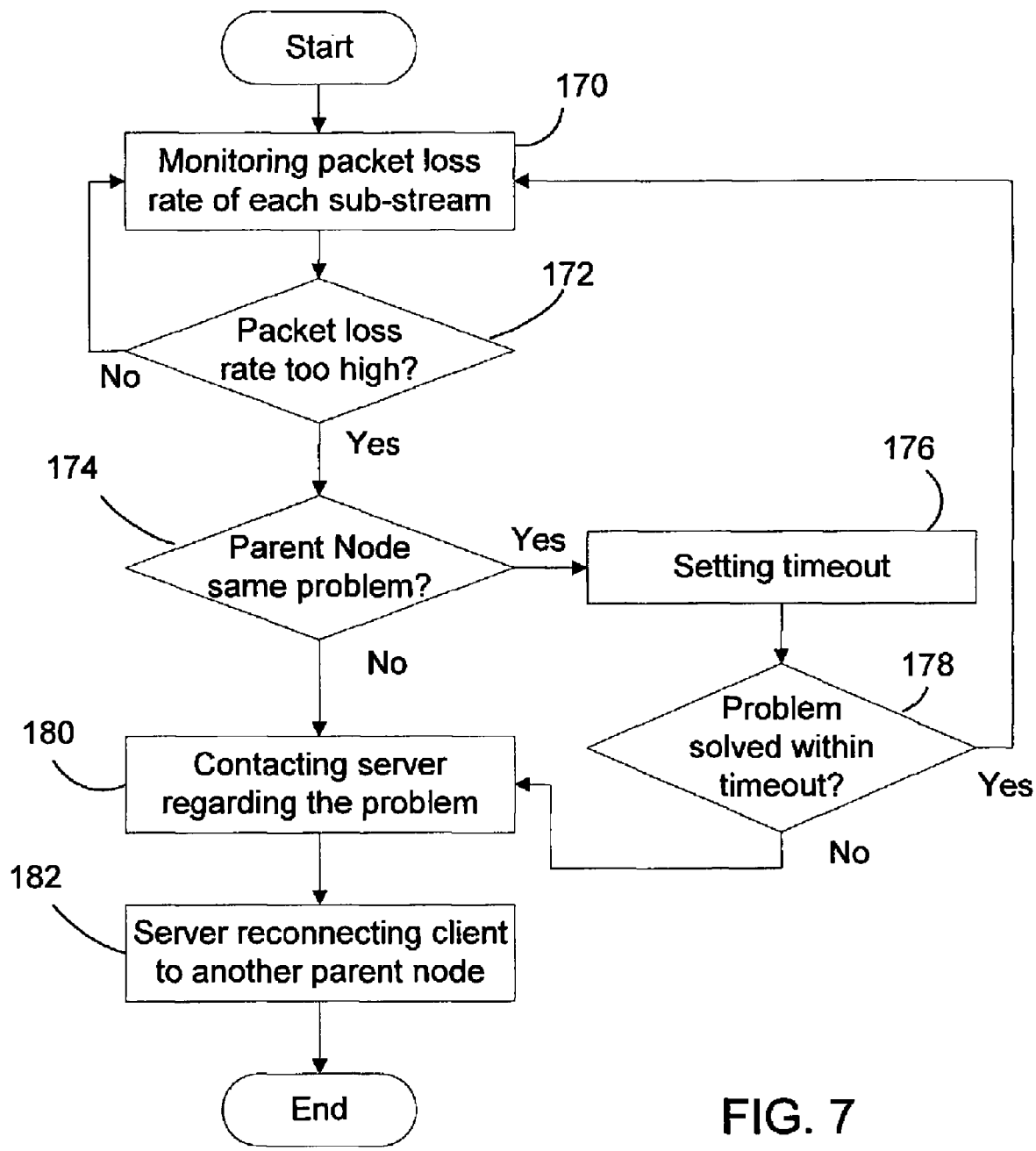
FIG. 7 is a flowchart showing a process of a preferred embodiment for repairing the distribution trees when a client departs.

A node failure corresponds to the case where the departing node leaves suddenly and fails to notify either the server or any other node of its departure. This may be caused by a computer crash, being turned off, or becoming disconnected from the network, etc. A node failure may be viewed as a special case of quality degradation due to packet loss. When a node fails, the packet loss experienced by its descendant nodes is 100%. Referring to FIG. 7, each client monitors the packet loss rate it is experiencing in each of the distribution trees (step 170). When a node finds that the packet loss rate for a given distribution tree reaches an unacceptable level (step 172), it notifies its parent node in that tree to see whether the parent node is having the same problem (step 174). If so, the source of the problem (e.g., network congestion, note failure, etc.) is upstream of the parent, and the child node leaves it to the parent node to deal with the problem. In this regard, the child node may set a sufficiently long time-out period (step 176), and takes actions on its own if the parent node cannot resolve the problem within the time-out period (step 178). If, however, the parent node is not experiencing the same problem or does not respond to the inquiry of the child node, the child node contacts the server (step 180). In response, the server executes a fresh join operation (step 182) as described above to find a new parent node in the distribution tree for this node (and its subtree).

In a preferred embodiment, the tree construction and management are optimized in two ways. The first optimization seeks to make the distribution trees efficient. The basic concept is to preferentially attach a new mode as the child of an existing of node that is "nearby" in the sense of network distance (i.e., low latency). The idea of "nearby" is kept broad enough to accommodate significant tree diversity. When trying to insert a new node, the server first identifies a sufficiently large subset of nodes that are close to the new node. Using the randomized top-down procedure for node join as described above, the server tries to find a parent for the new node in each tree among the set of the selected nearby nodes. When this procedure is followed, it is likely that many of the parents of the new node on the different distribution trees are in the same network vicinity, which is beneficial from an efficiency viewpoint. Also, it should still provide sufficient diversity, since the primary failure mode of concern here is node departures and node failures, and it normally does not matter much whether the parents are located in the same vicinity (e.g., the same metropolitan area).

In one implementation, to determine the network distance between two nodes, each node determines its network "coordinate" by measuring the network latency (e.g., by sending "ping" messages) to a set of pre-selected landmark hosts. In practice, about 10 well-distributed landmark hosts should suffice. The coordinate of a node is the n-tuple $(d_1, d_2, \ldots, d_n)$, where n is the number of landmarks used, and $d_i$ is the network distance between the client and the ith landmark. The server keeps track of the coordinates of all nodes currently in the system. To that end, the server may require each client to provide its network coordinate in its request to receive the streaming content from the server. This information is preferably updated from time to time to reflect the current network status by requiring the existing clients to periodically send updated coordinates to the server. When the server is contacted by a new client, it finds the "nearby" nodes for this new client by comparing the coordinate of the new client with the coordinates of the existing nodes. This comparison may, for example, involve computing the Euclidean distance between the coordinates of two nodes, computing a different distance metric such as the Manhattan distance, or simply comparing the relative ordering of the various landmarks based on the measured latency.

Another possible optimization is based on the observation that it would be beneficial to have more "stable" nodes close to the root of the tree. In this context, "stable" nodes are the ones that are likely to participate in the streaming data distribution for a long duration and have good network connectivity (e.g., few disruptions due to competing traffic from other applications). Having such nodes close to the root (i.e., the server) of the tree would benefit their descendents. As a background process, the server could identify stable nodes by monitoring their past behavior and migrate them up the tree.

The number of distribution trees (i.e., the number of MDC descriptions) is one parameters that can be adjusted to achieve the probability distribution of the fractions of descriptions received by the clients. Generally, as the number of descriptions increases, the percentage of clients that receive all of the descriptions will decrease. On the other hand, increasing the number of MDC descriptions also has the effect of decreasing drastically the percentage of clients that receive zero or very few of the descriptions. In one study, with the maximum out-degree of each client set to 4 and that of the root (i.e., the server) set to 100, when 8 MDC distributions (i.e., 8 sub-streams sent down 8 distribution trees) are used, 96% of the clients receive more than 87.5% of the descriptions, and practically all clients receive at least one description.

The out-degree of the root also affects the distribution of the descriptions received. As the root out-degree increases, the distribution trees are shortened, i.e., there are fewer ancestors for nodes in the tree. This increases the probability that a node will receive a particular description.

In view of the many possible embodiments to which the principles of this invention may be applied, it should be recognized that the embodiments described herein with respect to the drawing figures are meant to be illustrative only and should not be taken as limiting the scope of the invention. Therefore, the invention as described herein contemplates all such embodiments as may come within the scope of the following claims and equivalents thereof.

What is claimed is:

1. A computer-readable storage medium having computer-executable instructions for a network server to perform steps for distributing streaming media content over a network to a plurality of clients that have requested to receive the streaming media content, comprising:

forming at least first and second distinct distribution trees, each distribution tree having the server as its root and having as its nodes the clients of the plurality of clients, wherein each client of the plurality of clients serves as a node in the first distinct distribution tree and serves as a node in the second distinct distribution tree; receiving a request from a new client for the streaming media content; and selecting a parent node based on the proximity in terms of network distance from the parent node to the new client in each of the distribution trees for the client from which the new client is to receive a corresponding sub-stream, and wherein each client is assigned a random position in the first and second distinct distribution trees and has a random set of ancestors in each of the first and second distinct distribution trees;

dividing the streaming media content into at least first and second sub-streams, wherein dividing includes performing multiple description coding based on layered encoding of the streaming media content, minimum distance separable coding, and priority encoding transmission, wherein the step of dividing includes partitioning the streaming media content into groups of frames, and encoding each group of frames into a plurality of packets each to be included in a corresponding sub-stream; and transmitting the first and second sub-streams of the streaming media content down the respective first and second distinct distribution trees to a client that has requested to receive the streaming media content.

2. A computer-readable storage medium as in claim 1, wherein the step of dividing further includes adjusting rate points of the partitioning to minimize expected distortion of streaming media content received by the clients.

3. A computer-readable storage medium as in claim 2, wherein the step of adjusting is performed dynamically during transmission of the streaming media content.

4. A computer-readable storage medium as in claim 1, wherein the step of dividing uses forward error correction coding.

5. A computer-readable storage medium as in claim 1, further including the step of informing the new client of the parent nodes in the distribution trees selected for the new client.

6. A computer-readable storage medium as in claim 1, wherein the step of selecting includes identifying a plurality of nodes in a distribution tree that are available to be a parent node of the new client, and randomly selecting one of the available nodes to be the parent node of the new client in said distribution tree.

7. A computer-readable storage medium as in claim 6, wherein the available nodes are identified based on their proximity in terms of network distance to the new client.

8. A computer-readable storage medium as in claim 7, wherein the step of identifying the available nodes includes estimating the proximity of the available nodes and the new client based on their network coordinates.

9. A computer-readable storage medium as in claim 8, wherein the network coordinates are with reference to a pre-selected set of landmarks.

10. A computer-readable storage medium as in claim 1, further including the steps of:

receiving a notice of departure from a departing client;

in each distribution tree, identifying child nodes of the departing client; and reassigning a parent node in said each distribution tree for each of the child nodes.

11. A computer-readable storage medium as in claim 1, further including the steps of:

receiving a notice of high packet loss rate in a sub-stream from an existing client;

reassigning a parent node in the distribution tree corresponding to said sub-stream to the existing client.

12. A method of distributing streaming media content over a network from a server to a plurality of clients that have requested to receive the streaming media content, comprising:

forming, by the server, at least first and second distinct distribution trees, each distribution tree having the server as its root and having as its nodes the clients of the plurality of clients, wherein each client of the plurality of clients serves as a node in the first distinct distribution tree and serves as a node in the second distinct distribution tree; and receiving a request from a new client for the streaming media content and selecting a parent node based on the proximity in terms of network distance from the parent node to the new client in each of the distribution trees for the client from which the new client is to receive a corresponding sub-stream, wherein each client is assigned a random position in the first and second distinct distribution trees and has a random set of ancestors in each of the first and second distinct distribution trees;

dividing, by the server, the streaming media content into at least first and second sub-streams, wherein the step of dividing includes partitioning the streaming media content into groups of frames, and encoding each group of frames into a plurality of packets each to be included in a corresponding sub-stream, wherein dividing includes performing multiple description coding based on layered encoding of the streaming media content, minimum distance separable coding, and priority encoding transmission;

transmitting, by the server, the first and second sub-streams down the respective first and second distinct distribution trees;

receiving, by each client, the first and second sub-streams from its parent nodes in the respective first and second distinct distribution trees;

reconstructing, by said each client, the streaming media content from the received first and second sub-streams; and forwarding, by each client that has child nodes in the distribution trees, sub-streams received by said each client through the distribution trees to the child nodes in the respective distribution trees.

13. A method as in claim 12, wherein the step of dividing includes partitioning the streaming media content into a plurality of groups of frames, and encoding each group of frames into a plurality of packets each to be included in a corresponding one of the sub-streams.

14. A method as in claim 12, wherein the step of dividing uses forward error correction coding.

15. A method as in claim 12, further comprising:
repairing, by the server, the distribution trees upon departure of a departing client by reassigning parent nodes to child nodes of the departing client in the distribution trees.

16. A method as in claim 12, further comprising steps by the server of:
receiving a request from a new client for the streaming media content;
selecting in each of the distribution trees a parent node for the client from which the new client is to receive a corresponding sub-stream.

17. A method for distributing streaming media content over a network from a server to a plurality of clients that have requested to receive the streaming media content, comprising:

forming at least first and second distinct distribution trees, each distribution tree having the server as its root and having as its nodes the clients of the plurality of clients, wherein each client of the plurality of clients serves as a node in the first distinct distribution tree and serves as a node in the second distinct distribution tree; receiving a request from a new client for the streaming media content; and selecting a parent node based on the proximity in terms of network distance from the parent node to the new client in each of the distribution trees for the client from which the new client is to receive a corresponding sub-stream, and wherein each client is assigned a random position in the first and second distinct distribution trees and has a random set of ancestors in each of the first and second distinct distribution trees;

dividing the streaming media content into at least first and second sub streams, wherein the step of dividing includes partitioning the streaming media content into groups of frames, and encoding each group of frames into a plurality of packets each to be included in a corresponding sub-stream, wherein dividing includes performing multiple description coding based on layered encoding of the streaming media content, minimum distance separable coding and priority encoding transmission; and transmitting the first and second sub streams of the streaming media content down the respective first and second distinct distribution trees.

* * * * *